US011237885B2

(12) United States Patent
Feuz et al.

(10) Patent No.: US 11,237,885 B2
(45) Date of Patent: Feb. 1, 2022

(54) DETERMINING WHETHER AND/OR WHEN TO PROVIDE NOTIFICATIONS, BASED ON APPLICATION CONTENT, TO MITIGATE COMPUTATIONALLY WASTEFUL APPLICATION-LAUNCHING BEHAVIOR

(71) Applicant: Google LLC, Mountain View, CA (US)

(72) Inventors: Sandro Feuz, Zurich (CH); Victor Carbune, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/251,476

(22) PCT Filed: Feb. 6, 2020

(86) PCT No.: PCT/US2020/016974
§ 371 (c)(1),
(2) Date: Dec. 11, 2020

(87) PCT Pub. No.: WO2021/158224
PCT Pub. Date: Aug. 12, 2021

(65) Prior Publication Data
US 2021/0406099 A1 Dec. 30, 2021

(51) Int. Cl.
*G06F 9/54* (2006.01)
*H04L 12/58* (2006.01)
(52) U.S. Cl.
CPC ............ *G06F 9/542* (2013.01); *H04L 51/24* (2013.01)
(58) Field of Classification Search
CPC ........ G06F 9/4812; G06F 9/542; H04L 29/06
USPC ...................................................... 719/318
See application file for complete search history.

(56) References Cited

U.S. PATENT DOCUMENTS

| 8,943,197 | B1 | 1/2015 | Taylor et al. |
| 10,257,145 | B2 * | 4/2019 | Nayak ..................... H04L 51/18 |
| 10,275,410 | B2 * | 4/2019 | Tiu, Jr. .................. G06F 16/954 |
| 10,469,607 | B2 * | 11/2019 | Brunn ..................... H04L 67/26 |
| 10,540,059 | B2 * | 1/2020 | LaPier .................. G06F 40/169 |
| 2014/0129661 | A1 | 5/2014 | Thyagaraja |
| 2014/0181843 | A1 | 6/2014 | Yang |

OTHER PUBLICATIONS

European Patent Office; Invitation to Pay Additional Fees; Ser. No. PCT/US/2020/016974; 17 pages; dated Oct. 9, 2020.
European Patent Office; International Search Report and Written Opinion for PCT Ser. No. PCT/US/2020/016974; 23 pages; dated Nov. 30, 2020.

* cited by examiner

*Primary Examiner* — Andy Ho
(74) *Attorney, Agent, or Firm* — Middleton Reutlinger

(57) ABSTRACT

Implementations set forth herein relate to intervening notifications provided by an application for mitigating computationally wasteful application launching behavior that is exhibited by some users. A state of a module of a target application can be identified by emulating user inputs previously provided by the user to the target application. In this way, the state of the module can be determined without visibly launching the target application. When the state of the module is determined to satisfy criteria for providing a notification to the user, the application can render a notification for the user. The application can provide intervening notifications for a variety of different target applications in order to reduce a frequency at which the user launches and closes applications to check for variations in target application content.

20 Claims, 13 Drawing Sheets

DETERMINING WHETHER AND/OR WHEN TO PROVIDE NOTIFICATIONS, BASED ON APPLICATION CONTENT, TO MITIGATE COMPUTATIONALLY WASTEFUL APPLICATION-LAUNCHING BEHAVIOR

BACKGROUND

Increasing prevalence of portable computing devices has led to an influx of applications that directly or indirectly encourage users to frequently launch the applications for viewing content. Although a user may repeatedly launch and close an application in order to check for changes to particular content that is available via the application—often the application will not have any changes to the particular content. For example, the user may frequently launch a particular application in order to see whether another user has posted new content. Because a user may not be able to independently determine precisely when new content has been posted by another user, the user may launch and close the particular application several times before the new content is actually posted and able to be viewed via the application. As a result, the user may inadvertently cause a computing device associated with the particular application to waste computational resources associated with the fruitless launching and closing of the particular application, such as power resources, processing resources, and/or network resources.

SUMMARY

Implementations set forth herein relate to providing an intervening notification, that can be provided using machine learning techniques and/or heuristic techniques, to mitigate occurrences of a user checking a target application, of a client device, for content updates. A particular application, that is distinct from the target application, can generate the notification and/or determine whether and/or when to provide the notification. The application can be, for example, an application installed on-top of an operating system of the client device and/or can itself form part of (or the entirety of) the operating system of the client device. Although the notification is directed to the target application (e.g., identifies the target application, includes a deep link to a module thereof, etc.), in various implementations the application can generate the notification, and/or determine whether and/or when to provide the notification, independent of the target application. Put another way, generating and/or provisioning of the notification can occur without the target application directing the generating and/or provisioning, and the notification is generated and/or provisioned independent of any notification(s) that are generated by the target application itself (if the target application even includes notification generating functionality).

Accordingly, the intervening notifications that are generated by the application can be different, in at least both timing and content, from any notifications that would otherwise be provided by a respective target application. For example, an intervening notification can be pre-emptively rendered—at least relative to any impending or forthcoming third party notification, in order to save the user from having to manually launch a corresponding target application. Additionally, the intervening notification can include content that the target application does not typically incorporate into third party notifications. In some implementations, an intervening notification can combine content from multiple different target applications in a way that is unique relative to any notifications otherwise provided by those multiple target applications. Consolidating content in this way can preserve computational resources that might otherwise be consumed when a user frequently launches different applications to check for updates and/or other dynamic content. For instance, a computing device may excessively consume battery charge as a result of a user frequently unlocking their device (e.g., employing facial identification for unlocking), launching a respective target application, and then navigating through the target application. Consuming battery life in this way can be considered wasteful—especially in circumstances in which the user accesses the target application to view a notification from the target application—but the notification corresponds to content that is not useful to the user.

In some implementations, intervening notifications can be generated according to a back-end process that simulates operations a user is predicted to take in order to check an application for application content. For example, the user can periodically access application content that was not previously available to the user when the user previously accessed the application. In order for the user to perceive the content, the user may navigate through various interfaces of the application to view a particular interface that corresponds to the source for the content. A series of actions performed by the user to navigate to the particular interface can, with prior permission from the user, be characterized by training data that is used to train one or more machine learning models. When the user arrives at a desired interface after performing certain actions, the user may indicate an interest in the application content by viewing application content for a threshold period of time, interacting with the application content, and/or otherwise expressing some discernible interest in the application content. The training data can therefore correlate the actions of the user to a positive user interaction for training the one or more machine learning models accordingly.

A machine learning model that is trained in this way can be employed by a computing device in order to execute a process for autonomously accessing application content and generating intervening notifications from the application content. The process for generating the intervening notifications can be performed by accessing a particular application and executing one or more operations based on an initial state of the application. Initially, various data can be processed to determine whether a current context of the user is suitable for providing an intervening notification to the user to prevent the user from frequently checking their application. When the current context is determined to be suitable for providing the intervening notification, a target application can be selected based on the current context. An application state for a target application module can then be determined by emulating previous interactions between a user and the target application. For example, a trained machine learning model and/or heuristic techniques can be used to identify one or more operations to perform in order to reach a particular application interface that the user is predicted to navigate to, based on the current context.

As an example, the trained machine learning model can be used to process contextual data that characterizes operating states of various devices within a home of the user and/or operating states of various applications associated with the user. The contextual data can indicate that a "relaxing" music playlist is playing in the home of the user, a thermostat in the home is set to 72 degrees, and the user has just (e.g., within a threshold period of time) requested an automated assistant enabled device to secure an alarm system for the home (e.g., "Hey Assistant, secure the alarm system."). The contextual data can be processed by the trained machine learning model and, based on this processing, an indication (e.g., a probability) can be generated for predicting whether the current context is one in which the user is likely to check a particular application via their cellular phone, or other computing device. In some instances, the contextual data can characterize one or more instances in which the user checked the weather application at a particular point in the day and/or a previous day, in order to see a weather forecast for the following day or days. Therefore, processing of the contextual data can result in a prediction that the user will access a weather application at a particular time in order to determine whether a weather forecast for the following day has changed since the user last checked the weather application earlier in the day.

Based on this prediction that the user will access the weather application, the trained machine learning model can be employed to identify the weather application as an application that the user is predicted to access, and/or identify operations that the user is predicted to take in order to navigate to a desired interface of the weather application. For example, the predicted operations can be one or more touch interface inputs that result in the weather application rendering a forecast for the following day. The operations can be simulated by a first party (e.g., an automated assistant, an operating system, a computing device, etc.) in order to cause the weather application to generate content for a "next day" forecast graphical user interface (GUI). In some implementations, the content generated for a resulting interface can be processed by a trained machine learning model in order to determine whether the content is suitable for incorporating into an intervening notification. Additionally, or alternatively, the content generated for the resulting interface can be processed and compared to previous content in order to determine whether there is a difference in content that satisfies a notification criteria. When content is identified that satisfies the notification criteria, the application can generate the intervening notification using the content and/or any other information.

The intervening notification that is generated in this example can include content that characterizes a difference between a most recent "next day" forecast and the forecast that was rendered when the user previously accessed the "next day" forecast of the weather application. Additionally, or alternatively, the intervening notification that is generated can embody content that characterizes the most recent "next day" forecast provided by the weather application. In this way, the user can rely on the application to compile content for notifications that are rendered according to interests of the user—rather than necessitating that the user frequently provide the same series of inputs in order to reach an interface with dynamic content. Furthermore, this can preserve computational resources by compiling the content without rendering graphical user interfaces of the weather application. This can eliminate the need for further graphics to be buffered by a graphics processor, and can preserve power by rendering less content at a display panel of a computing device. Furthermore, when the application emulates the user inputs to check for changes to a state of a module of a target application, the target application may not appear in a "recent applications" list, thereby conserving memory resources necessary to make such an identifier appear in the "recent applications" list. Moreover, when the user launches the target applications less frequently, a computing device will less frequently use background processes to keep the target applications available for launching.

As described herein, in some implementations contextual data must first be determined to satisfy one or more condition(s) before a particular application begins performance of at least some (e.g., any) processing, related to when a notification for the target application should be rendered. For example, before any such processing occurs one or more occurrences must be determined of a user: launching the target application, navigating to a particular module of the target application, and then quickly closing the target application. For instance, only after such occurrence(s) are observed will the application emulate input(s) to navigate to the particular module of a target application and/or process state data of the particular module to determine whether a difference between the current state and a prior state satisfies a notification criteria. In some of those implementations, before performing such processing, a preliminary notification can be rendered, at the client device. The preliminary notification can indicate, directly or indirectly, that such processing will occur and/or that manual monitoring for a change in the state of the module is not necessary. Optionally, the notification can prompt the user as to whether such processing should occur, and the processing will occur only if affirmative input is received responsive to the prompt. In these and other manners, the preliminary notification can prevent the user from manually continuing to check for the change in the state and the more resource efficient automated checking for the change in state can instead occur. Accordingly, in those implementations the conservation of battery and/or other resources can be further ensured through provisioning of a preliminary notification. In some implementations, the target application can be a website, a URL, a mobile application, a desktop application, a server application, and/or any other program or data capable of being executed at one or more computing devices.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
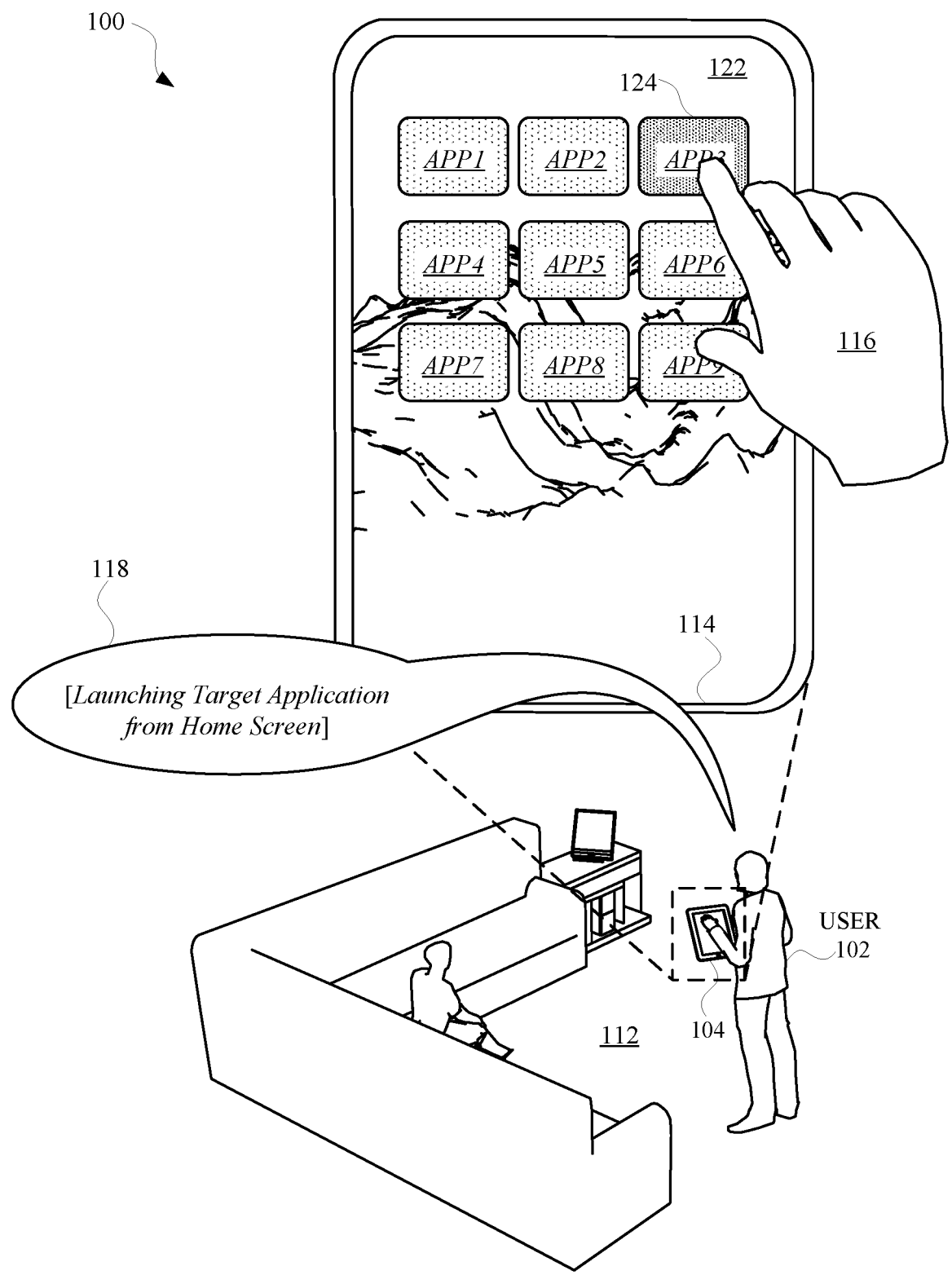
FIG. 1A, FIG. 1B, FIG. 1C, and FIG. 1D illustrate views of an instance of a user launching a target application to check for updated content and, shortly thereafter, closing the target application.
Figure 1B:
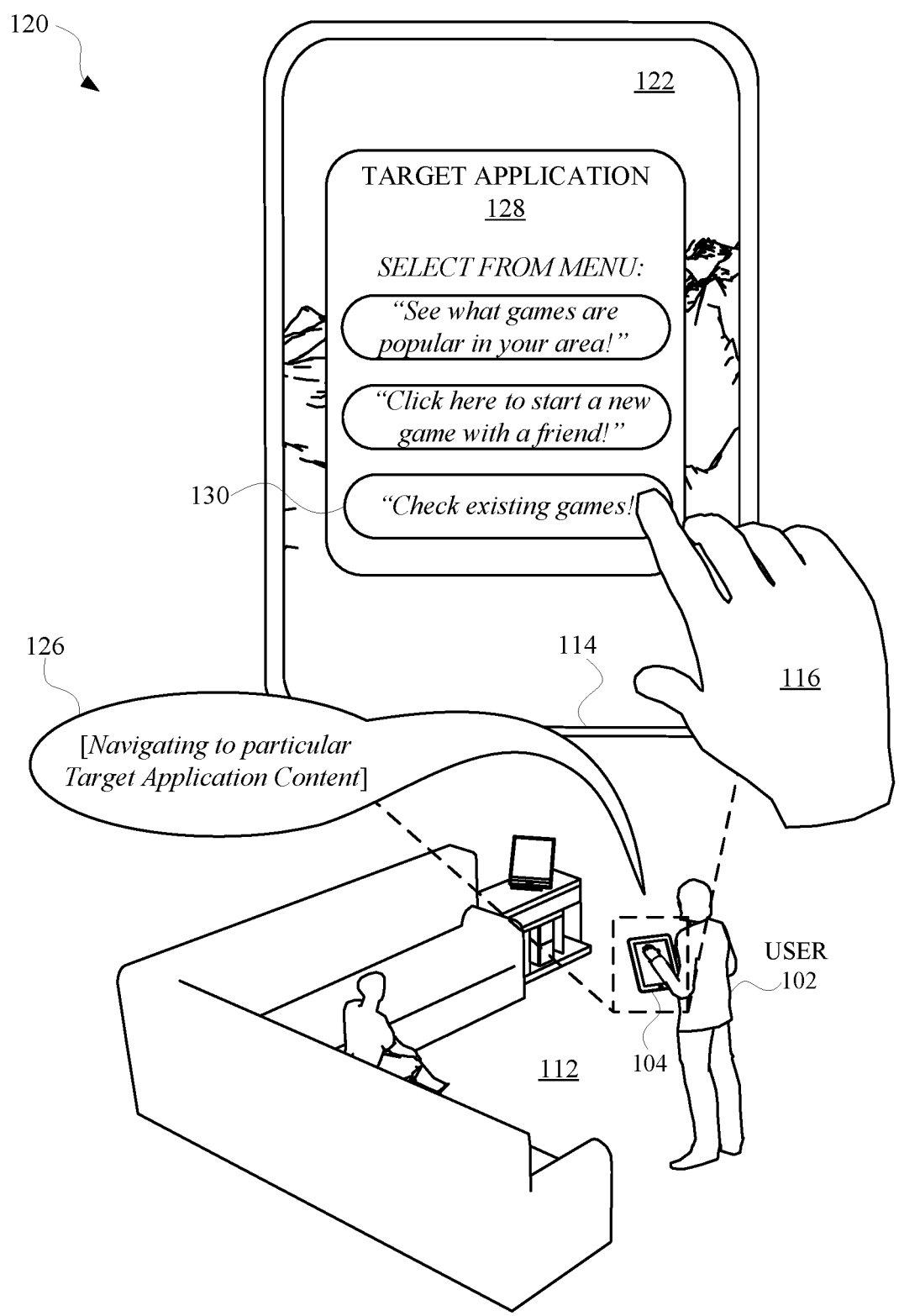
Figure 1C:
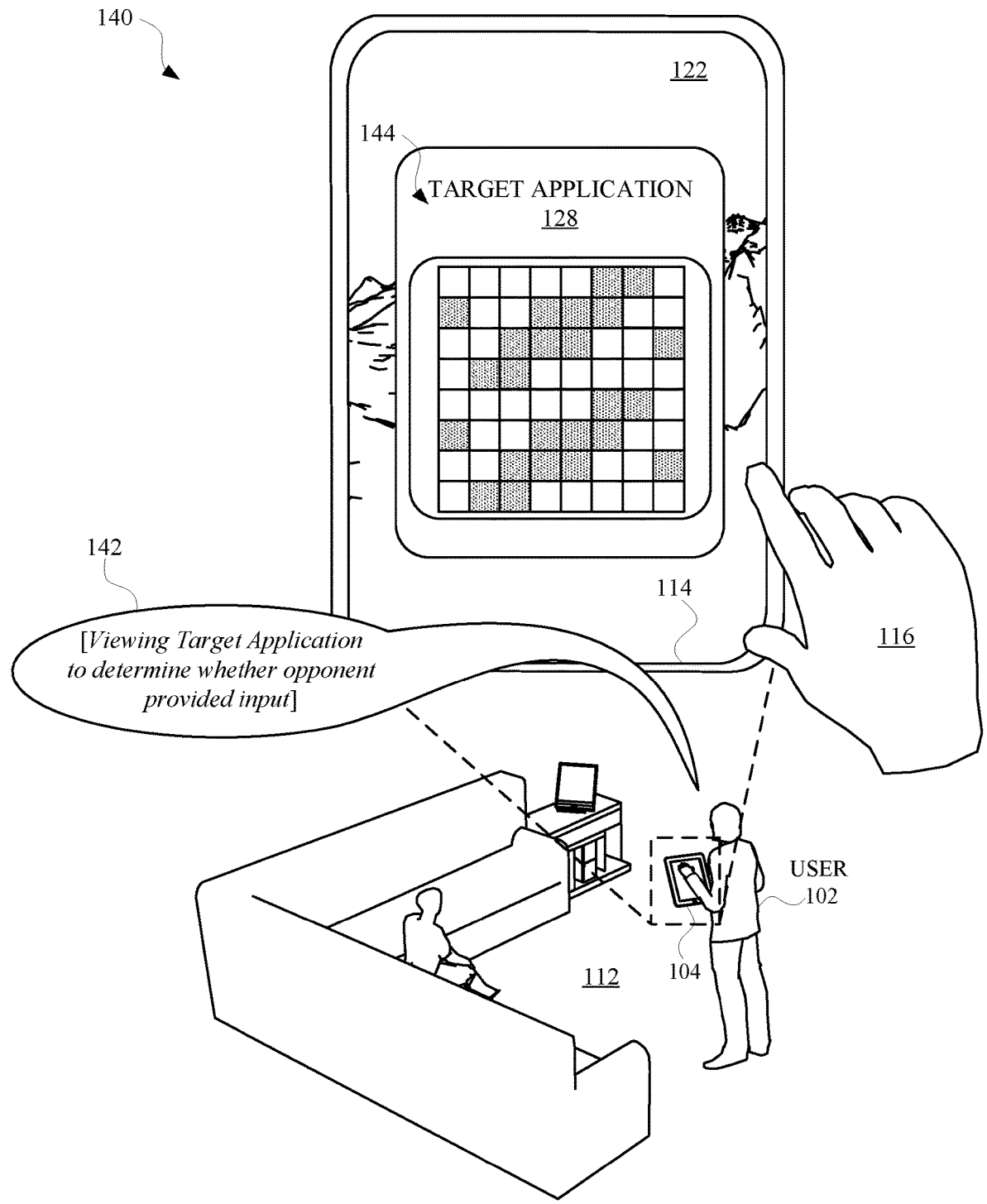
Figure 1D:
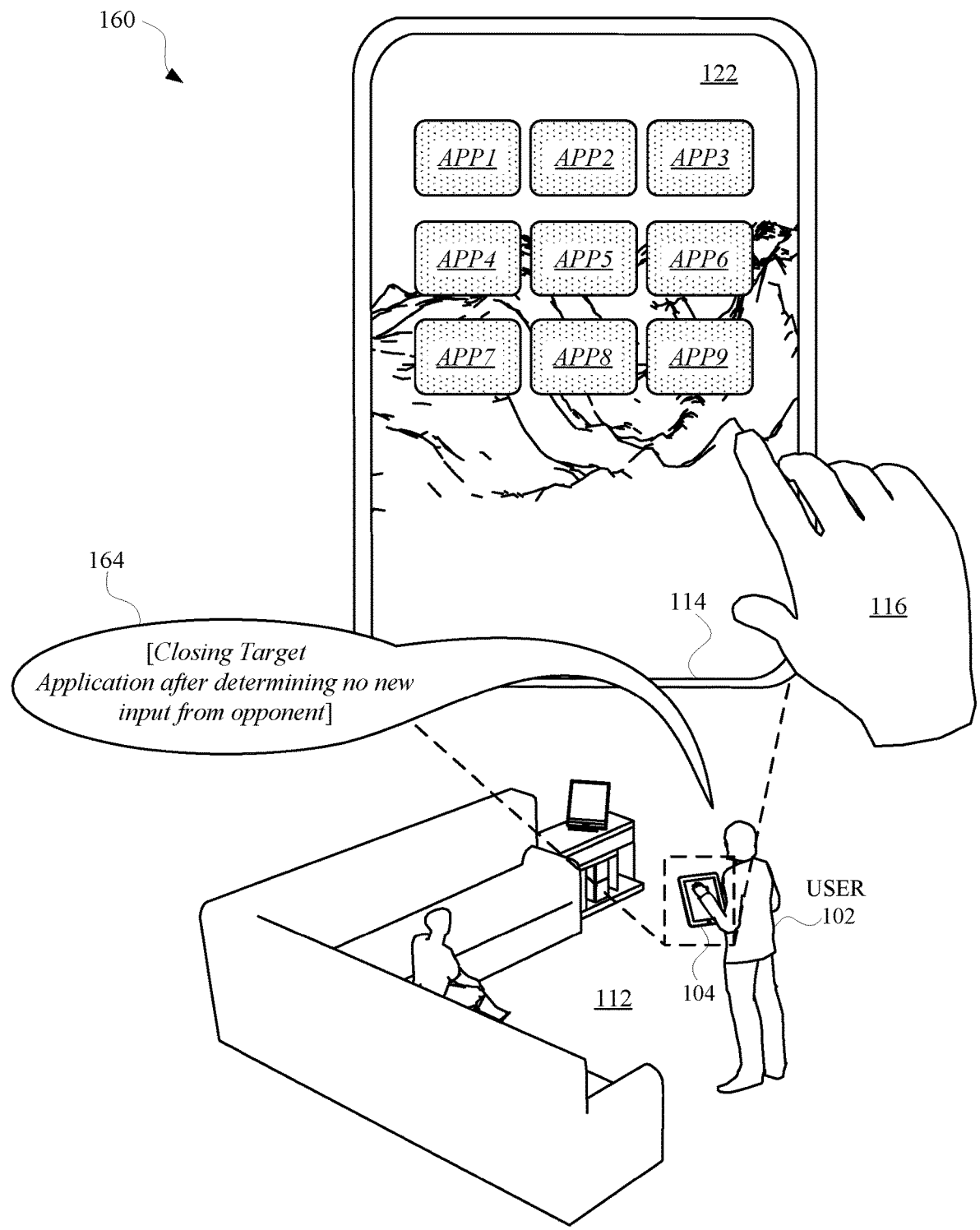

FIG. 1A, FIG. 1B, FIG. 1C, FIG. 1D illustrate a view 100, a view 120, a view 140, and a view 160 of an instance of a user 102 launching a target application 128 (e.g., "APP3"), and closing the target application 128 shortly thereafter. This instance of interaction can be characterized by data that can be used for generating intervening notifications for mitigating computationally wasteful application launching behavior. The user 102 can be interacting with a computing device 104 with or without a target application notification being previously being rendered at a graphical user interface 122 displayed at a display panel 114 of the computing device 104. In other words, the user 102 can independently decide to launch the target application 128 from a home screen of the computing device 104 in an environment 112, without necessarily receiving a notification prior to launching the target application 128 (e.g., "APP3").

The user 102 can launch the target application 128 using their hand 116 to select a selectable element 124 corresponding to the target application 128, and causing the target application 128 to execute, as indicated by user intention 118. In response to the user 102 selecting the target application notification, a target application 128 can be launched, as illustrated in view 120 of FIG. 1B. When the target application 128 launches, the user can have another user intention 126 of navigating to particular target application content. However, any current target application content may be trivial relative to content that the user 102 is seeking to find. For example, the target application 128 can be a game application in which the user 102 is playing a particular game against another user. Therefore, the user 102 may be frequently launching and closing the target application 128 to determine whether the other user has taken their turn or otherwise provided some input that the user 102 will need to respond to in order to further the game. In order to deduce whether the other user has taken their turn, the user 102 may provide one or more different inputs to the computing device 104.

For example, when the target application 128 is launched and rendering content, the user 102 can use their hand to select another selectable element 130 among other selectable elements. In response to the user 102 selecting the selectable element 130, the target application 128 can render another interface 144, as indicated in view 140 of FIG. 1C. The other interface 144 can corresponding to graphical rendering of a board game (e.g., "Go") that the user 102 is playing with the other user. The user 102 can view the target application to determine whether their opponent, the other user, has provided an input to their respective target application since the user 102 last provided an input (e.g., since the user 102 last moved a game piece). During a period of time, the user 102 may check the target application 128 multiple times only to discover that the other user has not provided any additional input. As a result, the user 102 may close the target application 128.

The user 102 can use their hand 116 in order to provide an input at the display panel 114 to close the target application 128. In response, and as illustrated in view 160 of FIG. 1D, the user intent 164 after viewing the target application content can be to close the target application 128. As a result, the computing device 104 can return to a state in which the target application 128 is no longer executing at the foreground of the graphical user interface 122 (e.g., the computing device 104 can return to rendering a "home screen").

The interaction between the target application 128 and the user 102 can be characterized by data that is used to generate intervening notifications by an application. In some implementations, the application can be a first party operating system of the computing device 104, an application executing at the computing device 104, one or more modules and/or engines executing at the computing device 104, and/or any other apparatus or module capable of interacting with a target application. In some implementations, the data characterizing the interactions can be training data that is used to train one or more machine learning models. A machine learning model that is trained using this training data can be employed when processing other data for determining an interest of the user in receiving a particular notification associated with the target application 128.

For example, data generated based on the interactions between the user 102 and the target application notification and/or the target application 128 can be used to determine how to access a particular state of a particular module (e.g., a graphical interface of a particular game) of the target application 128 in order to render a notification when a particular state is of interest to the user 102. For example, the interactions between the user 102 and the computing device 104 in FIG. 1A-1D can be characterized by user operations data (e.g., first input at selectable element 124 in home screen, second input at selectable element 130 in target application 128 menu), which can be used to thereafter emulate the user inputs in order to allow an intervening notification application to check the state of the module later. The user inputs selected for reaching the module can be determined from the operations data using a trained machine learning model (e.g., an application navigation model) and/or one or more heuristic techniques. Alternatively, or additionally, data generated based on the interactions can be used, by a machine learning model (e.g., a module state model) or with heuristic techniques, to determine whether a current state of the target application 128 would be of interest to the user 102 and/or whether a notification associated with the current state should be provided to the user 102.

Alternatively, or additionally, data generated based on the interactions can be used to determine how a user 102 indicates interest in a particular state of an application. For example, data characterizing the interaction illustrated in FIG. 1A, FIG. 1B, FIG. 1C, and FIG. 1D can indicate that the user closed the target application 128 within a threshold period of time of launching the target application 128. This instance of data can therefore characterize an interaction in which the user 102 was not interested in the notification from the target application 128. In some implementations, the data can be an instance of training data in which input training data can characterize a target application notification, content of the target application notification, a current state of the target application 128, a difference between the current state and a previous state of the target application 128, and/or any other information that can be associated with one or more applications. Alternatively, or additionally, the data can be an instance of training data in which output training data can characterize a heightened interest of the user 102 in the information characterized by the input training data. A machine learning model trained according to this training data can be used to process similar inputs associated with the target application 128 and/or any other application in order to generate one or more intervening notifications.

In some implementations, the application that generates the intervening notifications can be a third party application relative to a first party operating system that grants access permissions to the application. Alternatively, the application that generates the intervening notifications can be a first party application relative to a first party operating that grants access permissions to the application.

Figure 2A:
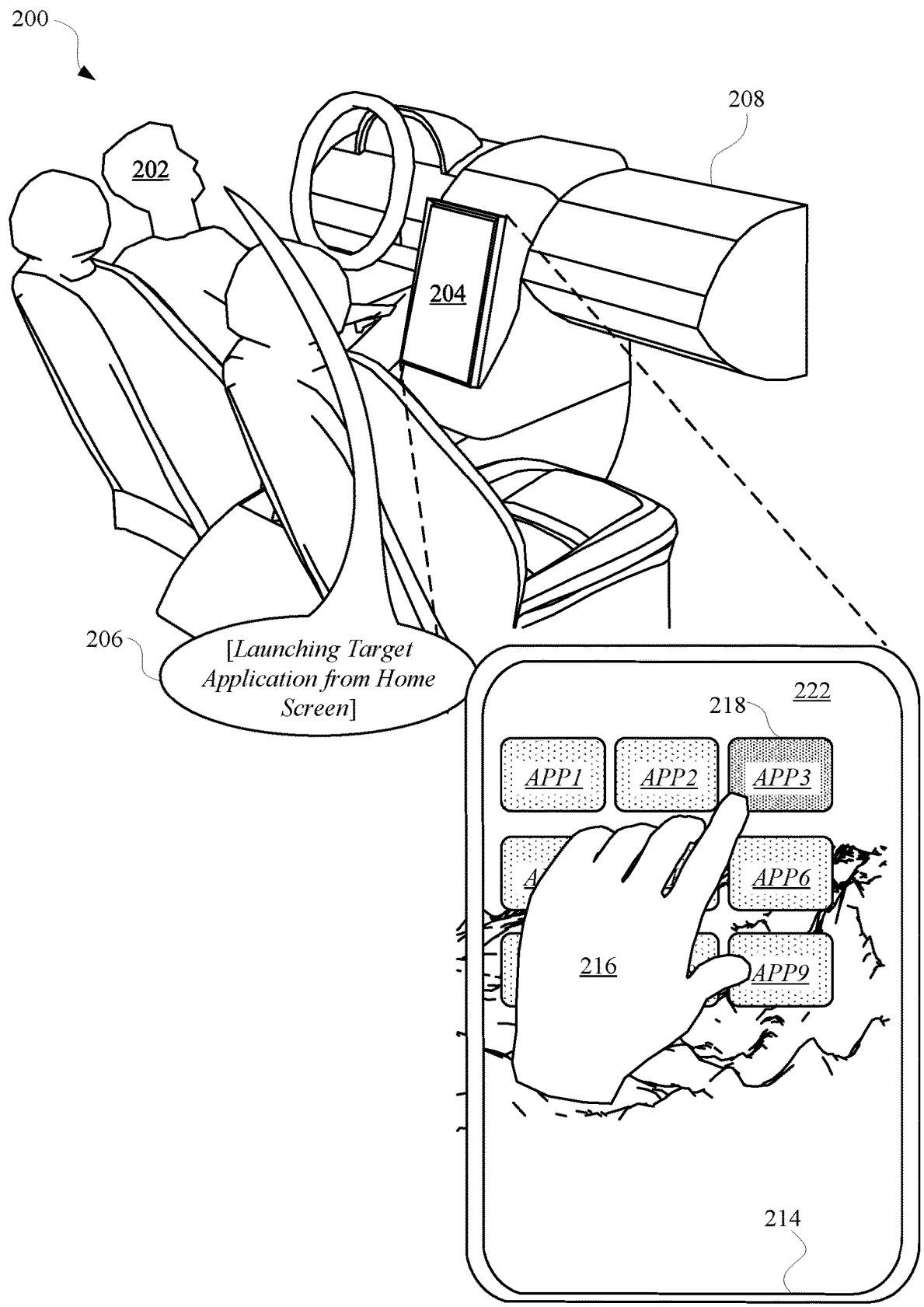
FIG. 2A, FIG. 2B, and FIG. 2C, illustrate views of an instance in which a user interacted with a notification provided by a target application, and the instance being a basis for subsequent intervening notifications.
Figure 2B:
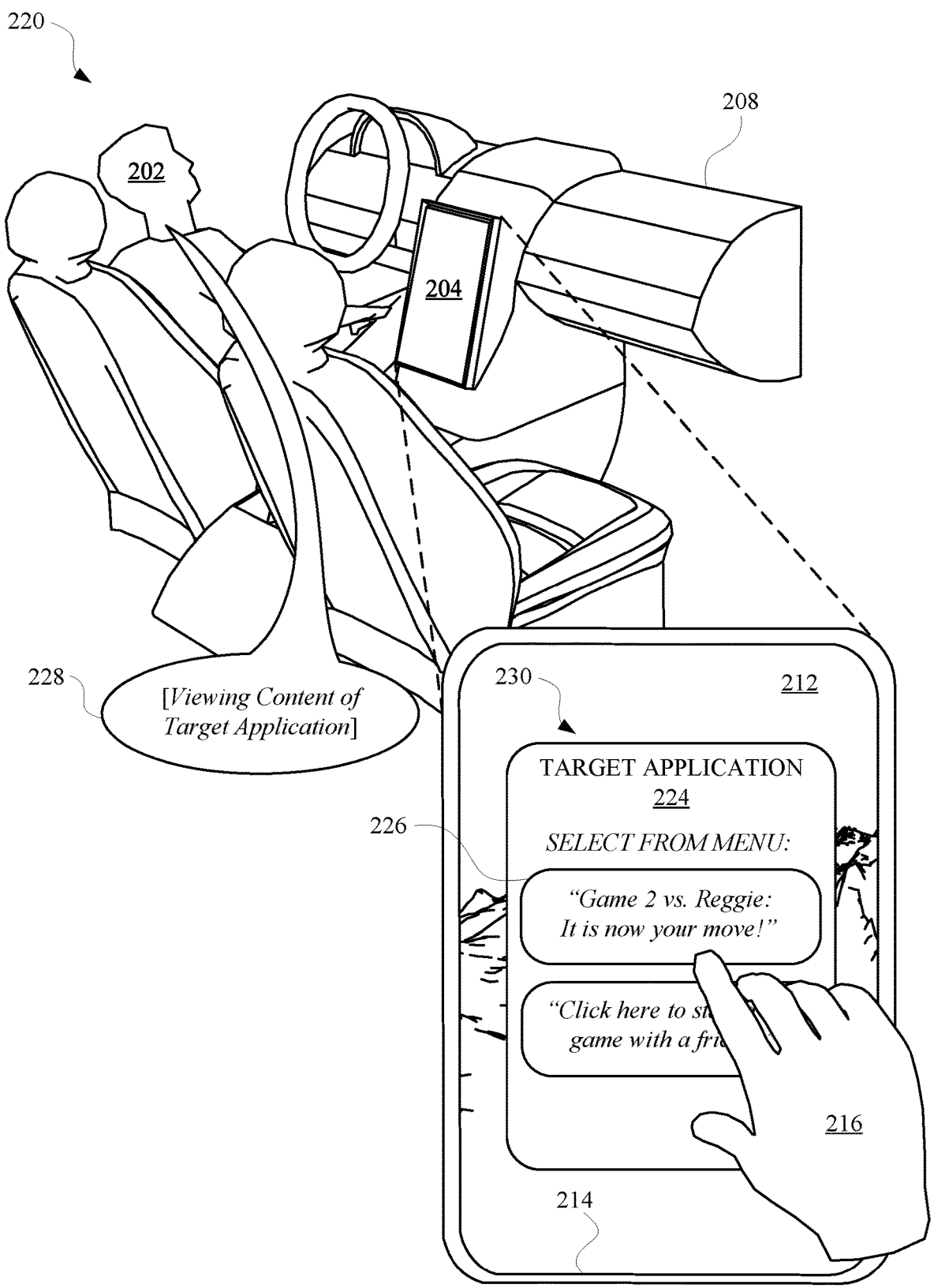
Figure 2C:
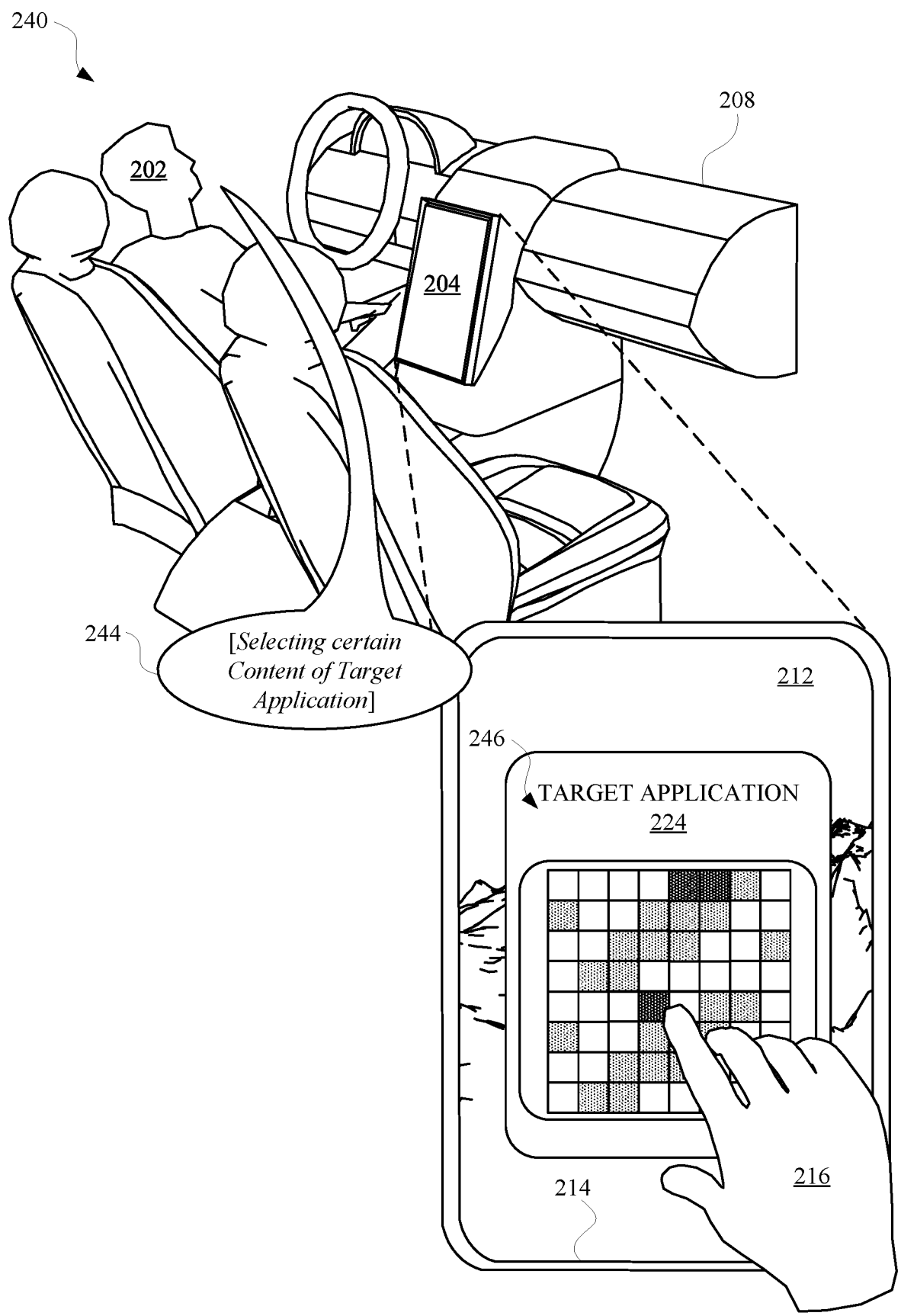

FIG. 2A, FIG. 2B, and FIG. 2C, illustrate a view 200, a view 220, and a view 240 of an instance in which a user 202 interacted with a notification provided by a target application (e.g., a third party application), and the instance being a basis for subsequent intervening notifications. An intervening notification can be based on this instance of an interaction between the user 202 and a target application, in order to generate meaningful intervening notifications. The notifications can be generated in order to mitigate wasteful application launching behavior. For example, when riding in a vehicle 208 that is autonomous, the user 202 can frequently select a selectable element 218 to launch from a graphical user interface 222 of a display panel 214 of the computing device 204. The user 202 may exhibit an intent 206 of launching a target application from a home screen of the computing device 204 in order to determine whether new content is available via the target application.

In response to the user 202 selecting the selectable element 218 (e.g., a shortcut for launching a third party application) at a computing device 204 within the vehicle 208, the computing device 204 can cause the target application 224 to be launched while the vehicle 208 is autonomously driving. In other words, an operating system at the computing device 204 can initially receive input from the user 202 to cause the computing device 204 to render the target application 224. The target application 224 may not be executing at the computing device 204 prior to the input, however, the target application 224 can be opened and/or launched in response to the user 202 providing an input to the computing device 204 in order to select the selectable element 218.

FIG. 2B illustrates a view 220 of the user 202 viewing content of the target application 224, as indicated by an additional user intent 228. The target application 224 can be launched in response to the user 202 selecting the selectable element 218, thereby causing a first interface 230 of the target application 224 can be rendered. In some implementations, the target application 224 can be the same application discussed with respect to FIG. 1A, FIG. 1B, and FIG. 1C. Alternatively, or additionally, the target application 224 can be different from the application discussed with respect to FIG. 1A, FIG. 1B, and FIG. 1C. For example, the target application 224 can be a game application, with which the user 202 is competing against other users (e.g., "Reggie").

Therefore, the user 202 may frequently launch and close the target application 224 in order to determine whether their opponent has taken any action and/or whether the user 202 is able to take action to further a game.

When the user 202 is viewing the target application content rendered at the graphical user interface 212, the user 202 can use their hand 216 in order to provide another input to the target application 224 and/or the computing device 204. In response to the user 202 selecting a selectable element 226 of the target application 224, a target application 224 and/or the computing device 204 can render a second interface 246. The second interface 246 can be, for example, an interactive interface of a game such as a "Go" board game. In response to the user 202 viewing the second interface 246, the user 202 can use their hands 216 in order to interact with the second interface 246, as indicated by the additional user intent 244. For example, the user 202 can select a portion of the graphical user interface 212 where a board for a board game is being rendered. This portion of the graphical user interface 212 and/or second interface 246 selected by the user 202 can correspond to one or more coordinates, one or more pixels of the display panel 214, an area of pixels of the display panel 214, and/or a dynamic range of pixels of the display panel 214. Data used to characterize the portion selected by the user 202 can be used to generate training data for training a machine learning model for assisting with identifying a module of the target application 224 that the user 202 is interested in seeing updates for. Additionally, or alternatively, the data characterizing the portion selected by the user 202 can be used to generate training data for training a machine learning model for assisting with identifying operations performed by the user 202 in order to reach a particular module of the target application 224. Additionally, or alternatively, the data characterizing the portion selected by the user 202 can be used to generated training data for training a machine learning model for assisting with determining whether a state of a module should be used as a basis for providing an intervening notification to the user 202 or not.

The computing device 204 can generate data characterizing the interaction illustrated in FIG. 2A, FIG. 2B, and FIG. 2C. The data can be used to generate subsequent notifications that may be of interest to the user and may also mitigate a frequency at which the user 202 exhibits application launching behavior. For example, the data can be an instance of training data where an output of the training data corresponds to a positive interaction between the user 202 and the target application 224. Furthermore, the instance of the training data can include an input characterizing the target application notification 222, the first interface rendered at FIG. 2B, and/or the second interface 246 rendered at FIG. 2C. Alternatively, or additionally, input data included in the training data can characterize a portion as the graphical user interface 212 that the user contacted with their hand 216 at FIG. 2B, and/or FIG. 2C. In some implementations, first data characterizing the first interface and/or second data characterizing the second interface 246 can be compared to other data characterizing a previous interface of the target application. For example, first data characterizing the first interface can be compared to other data characterizing an interface of the target application 128 rendered at FIG. 1B. Based on this comparison, state data can be generated for characterizing a difference between the first interface and the other interface. This state data can be used as input training data and correlated to output training data that characterizes an interest of the user in the first interface 230 and/or the second user interface 246.

In some implementations, input data characterizing one or more inputs provided by the user 202 to the computing device 204 and/or the target application 224 in order to arrive at the second interface 246 can be used to subsequently simulate the input(s) for accessing the second interface 246. Thereafter, the input data can be accessed by an application (e.g., a first party application) that can emulate the user 202 accessing content of the target application 224 without the content being visibly rendered at the graphical user interface 212 of the computing device 204 or another computing device. For example, the application, or a corresponding server-side application, can launch the target application 224 as a back-end process that is not visible to the user 202, but otherwise allows the application to access content for various different interfaces of the target application 224, with prior permission from the user 202. The content that is accessed can be dynamic content, in that the content is periodically updated by a third party entity, a third party server device, a third party computing device, and/or any other device or application that can be in communication with the computing device 204. When the application is using a trained machine learning model that is trained according to the training data, the application can periodically access the content of the target application 224 and process the content to determine whether to provide a notification to the user or not. A determination of whether to provide an intervening notification to the user 202 can be based on past interactions in which the user 202 or another user positively interacted with the content or dismissed the content.

Figure 3:
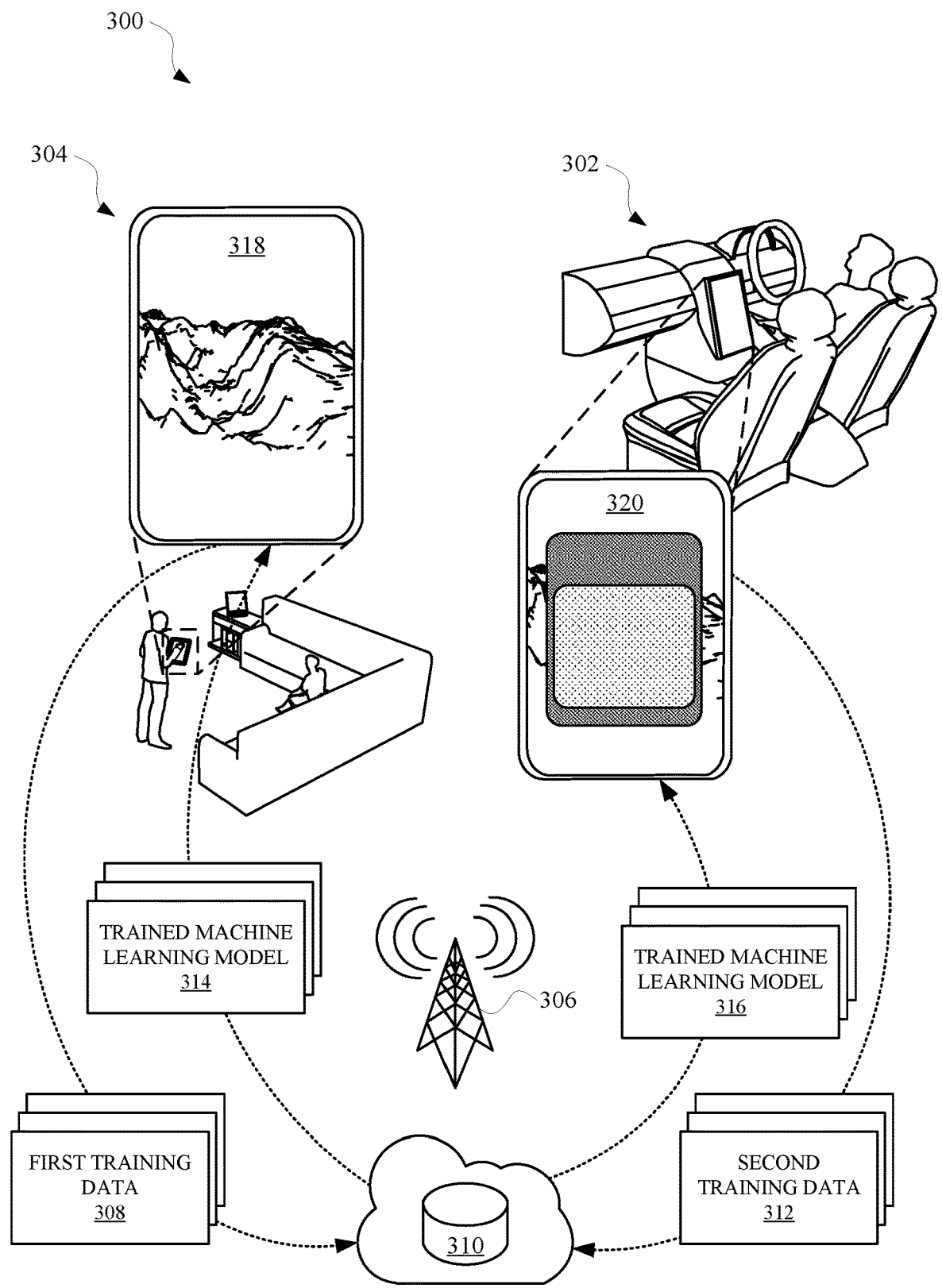
FIG. 3 provides a diagram that characterizes how, in some implementations, training data can be generated based on a variety of different scenarios in order to train a machine learning model for use when generating intervening notifications.

FIG. 3 provides a diagram 300 that characterizes how, in some implementations, training data can be generated based on a variety of different scenarios in order to train a machine learning model for use when generating intervening notifications. A first scenario 304 depicted in FIG. 3 can correspond to the scenario described with respect to FIG. 1A, FIG. 1B, and FIG. 1C. A second scenario 302 depicted in FIG. 3 can correspond to the scenario described with respect to FIG. 2A, FIG. 2B, and FIG. 2C. Based on the first scenario 304, first training data 308 can be generated to characterize a scenario in which the user launched a target application in response to acknowledging a third party notification. Furthermore, in the first scenario 304 the user closed the target application without exhibiting any interest in content generated by the target application. Furthermore, based on the second scenario 302, second training data 312 can be generated to characterize another scenario in which the user launched the target application in response to a separate third party notification. Additionally, in the second scenario 302, the user exhibited some amount of interest in content generated by the target application.

The first training data 308 can include input data characterizing one or more features of an environment in which the user interacted with the computing device and/or the target application. Additionally, the second training data 312 can include the input data characterizing one or more other features of a separate environment in which the user interaction with the computing device and/or the target application. Furthermore, the first training data 308 and second training data 312 can include output training data that is based on whether the user expressed interest in content corresponding to the third party notification. In some implementations, the output training data can be generated based on notification criteria that can be used when determining whether a state of a particular application is of interest to the user. For example, output training data corresponding to the first scenario 304 can include a value that does not satisfy a notification threshold, and the value can be determined based on the notification criteria.

For instance, the notification criteria can be a threshold amount of time that the user should engage with a particular interface or content of a target application before the value is characterized as a positive interaction (e.g., a value of 1). Furthermore, output training data corresponding to the second scenario 302 can include another value that does satisfy the notification threshold, and this other value can be determined also based on the notification criteria. Therefore, because the user may have engaged with another particular interface or other content of the target application for at least the threshold amount of time, this other value can indicate a positive interaction.

One or more trained machine learning models can be trained using the input training data and the output training data. In some implementations, federated learning can be performed in order to train one or more machine learning models using training data associated with a variety of different users and with prior permission from those users. When a machine learning model has been trained using the training data generated at the first scenario 304 and the second scenario 302, a resulting trained machine learning model can be accessed by one or more client devices associated with the user. For example, in some implementations, training of one or more machine learning models can be performed at a remote computing device 310, such as a server device that is in communication with a variety of different client devices over a network 306, such as the internet. In some implementations, simulation of user inputs to arrive at a particular application state and/or application content can be performed at a remote computing device 310, such as a server device that is in communication with a third party entity and a first party engine and/or module. A trained machine learning model 314 can be shared with a first computing device that the user interacted with in the first scenario 304. Another trained machine learning model 316 can be shared with a second computing device that the user interacted with in the second scenario 302. Each trained machine learning model can then be employed by each respective client device and/or automated assistant in order to allow the client device and/or the automated assistant to render intervening notifications for the user.

Figure 4A:
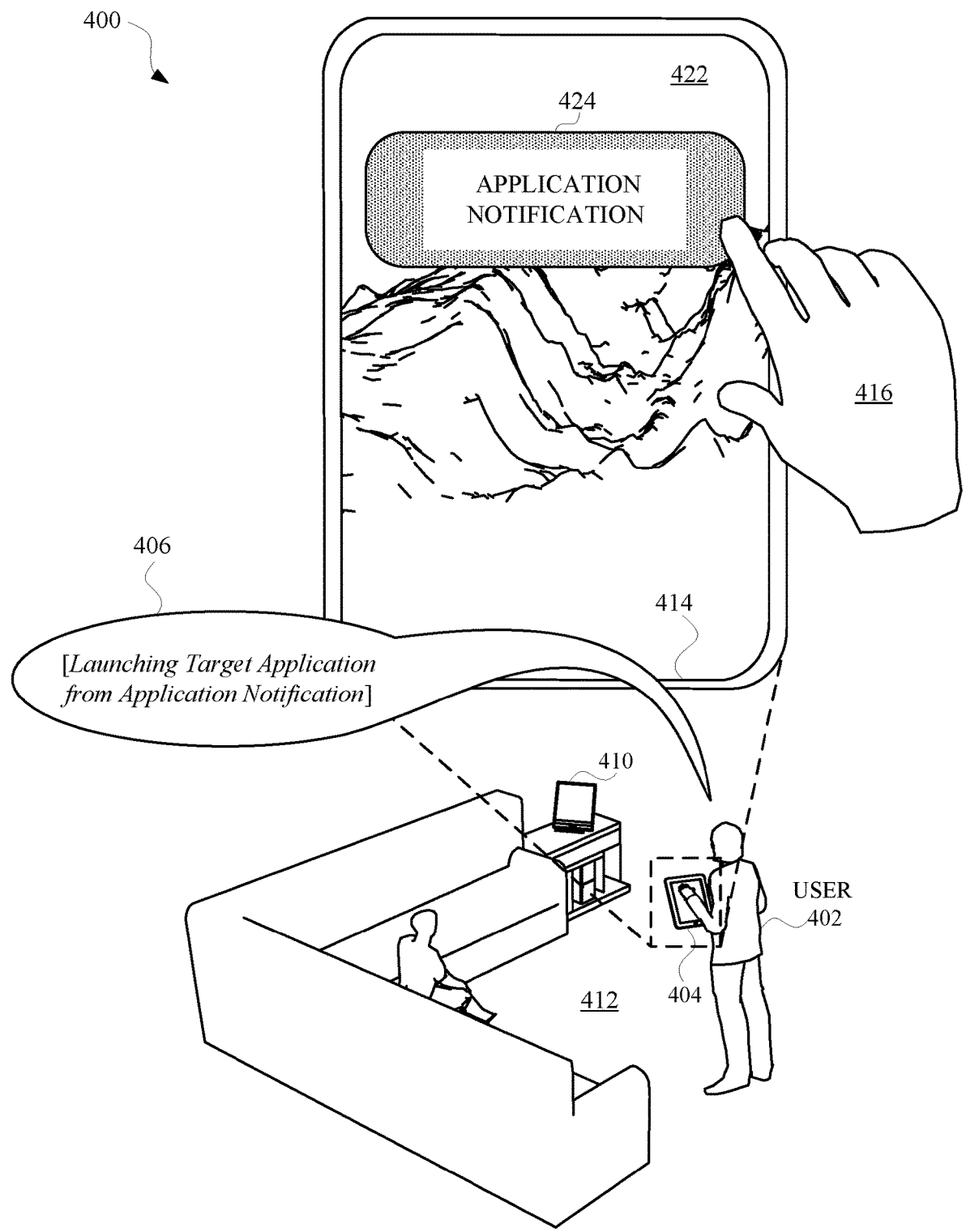
FIG. 4A and FIG. 4B illustrate views of a user accessing a target application in response to acknowledging an application notification that is generated based on previous interactions between the user and the target application.
Figure 4B:
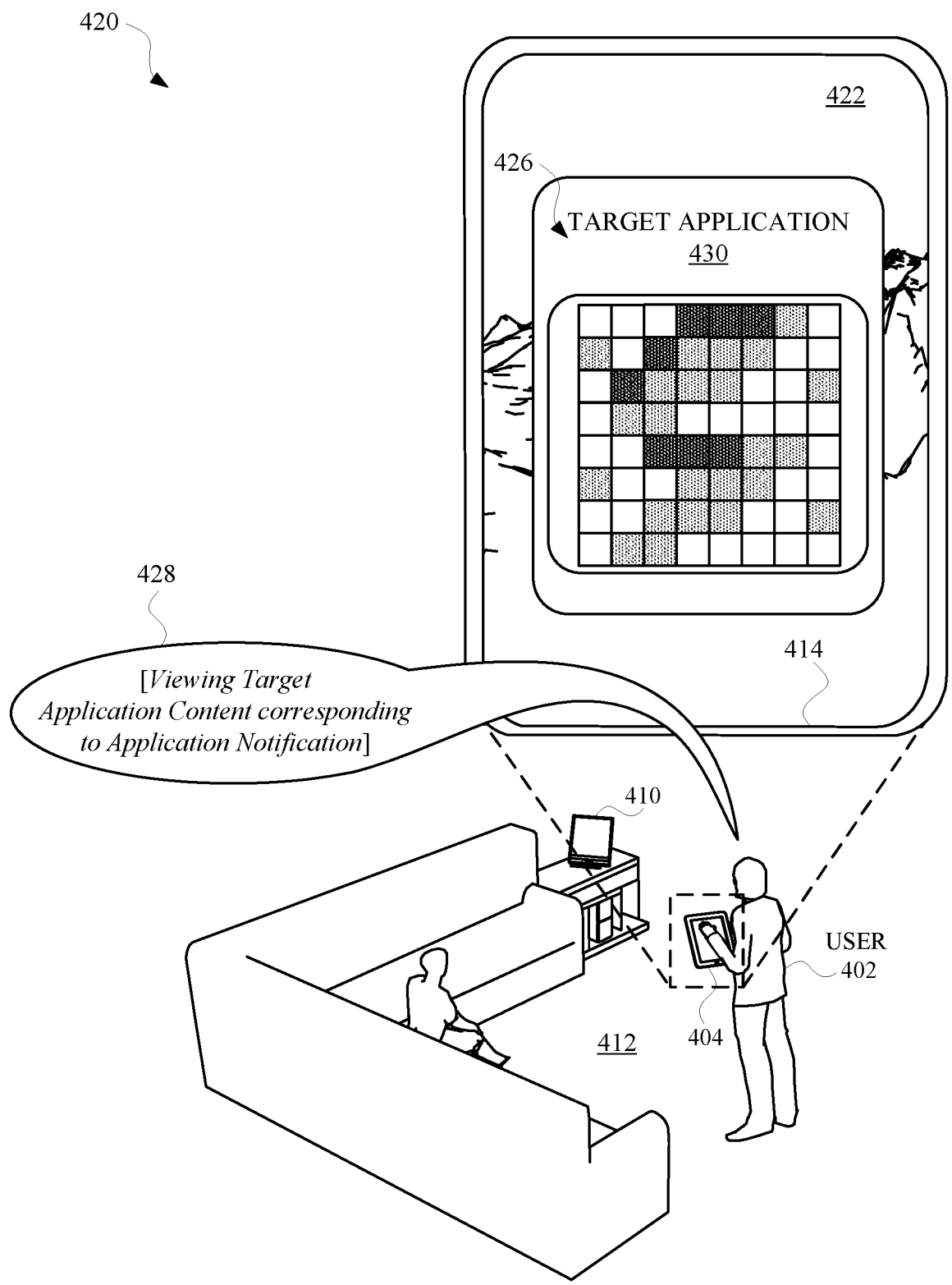

FIG. 4A and FIG. 4B illustrate a view 408 and view 420 of a user 402 accessing a target application in response to acknowledging an application notification that is generated based on previous interactions between the user 402 and the target application. In some implementations, an application can emulate interactions between the user 402 and the target application in order to determine whether or not to provide an application notification 424 to the user 402. An application can process contextual data from one or more sources in order to determine whether or not to initialize emulating such interactions. For example, the application can determine that the user 402 is proximate to another computing device 410 within an environment 412 in which the user 402 previously launched the target application to check for a particular update. Therefore, in response to the user 402 entering the environment 412 and/or determined to be proximate to the other computing device 410, the application can initialize emulating operations performed by the user 402 in order to access one or more particular modules available at the target application.

In some instances, when the application has completed emulating user operations for accessing certain content and/or a certain state of the target application, the application can identify content associated with this certain state.

The content can be processed by the trained machine learning model in order to determine whether the content satisfies a notification criteria. In some implementations, the operations performed by the application in order to access content of the target application can be performed without rendering a visible indication for the user 402. Alternatively, or additionally, the application can notify the user 402 when the application is emulating the user operations in order to access the content of a target application.

In some implementations, the content accessed by the application can be processed by a training machine learning model, and can be determined to satisfy the notification criteria based on such processing. When the content is determined to satisfy the notification criteria, the user 402 can provide an input to a computing device 404 in order to launch the target application via the application notification 424. The application notification can be rendered at a graphical user interface 422 that is provided at a display panel 414 of the computing device 404. As indicated by a user state 406, the user can observe the application notification 424 and launch the target application in response.

As illustrated in view 420 of FIG. 4B, the user can view the target application content corresponding to the intervening notification, as indicated by another user state 428. In response to the user 402 selecting the application notification 424, the application can emulate one or more user operations in order to cause the target application 430 to render the content that satisfied the notification criteria. For example, based on a heuristic observation, the application can determine that the user 402 is typically more interested in viewing a game interface 426 of the target application 430 rather than viewing ad content. Therefore, although the target application 430 may push notifications corresponding to ads, the user 402 can elect to turn off the target application notifications in order to rely exclusively on the application notifications that are generated for the target application 430. In this way, repetitive application launching and closing can be mitigated, thereby preserving battery life of the computing device 404, as well as computational resources that would otherwise be consumed by frequently rendering the target application 430 at the display panel 414.

Figure 5:
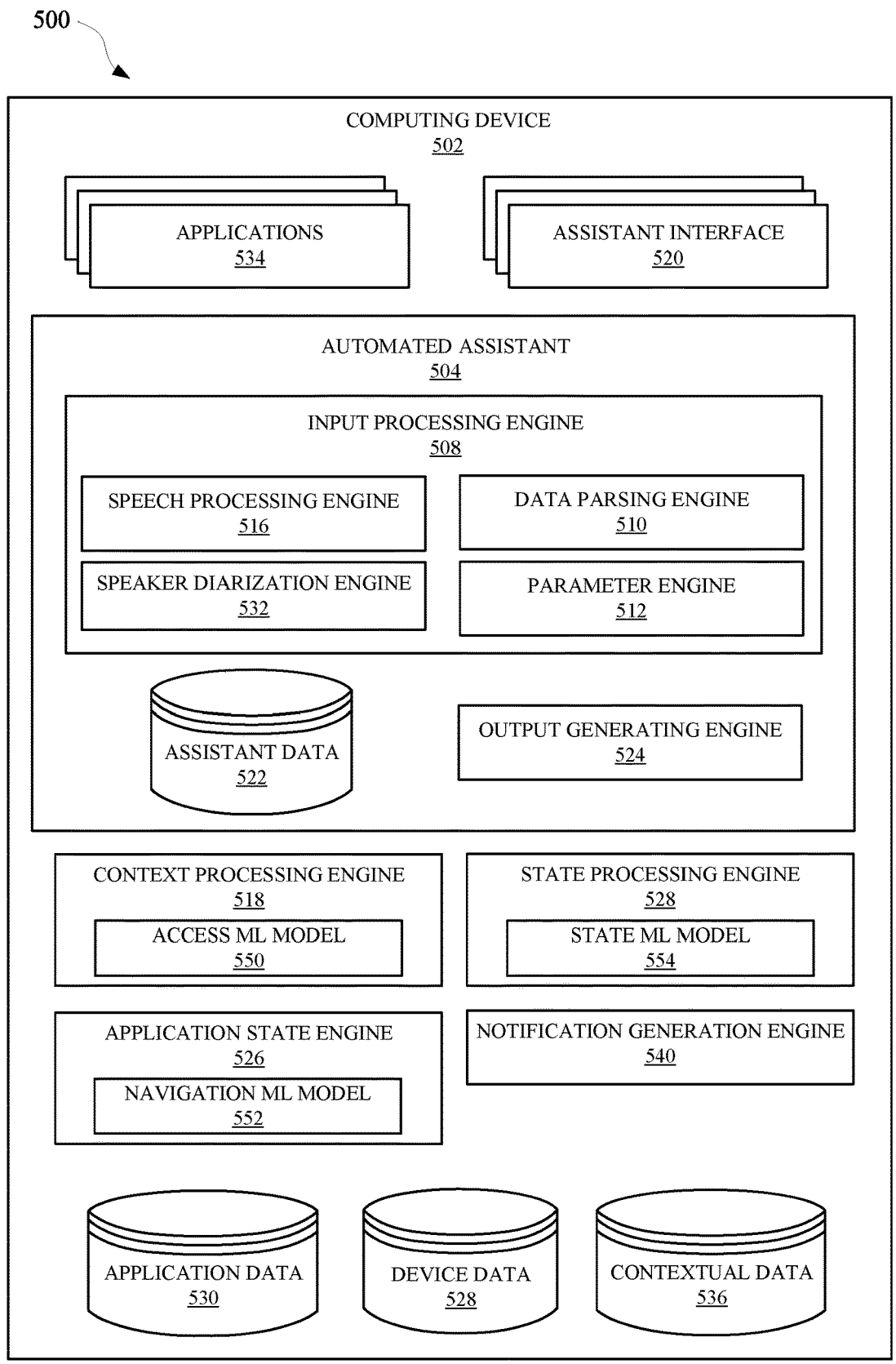
FIG. 5 illustrates a system for providing an automated assistant that can selectively determine whether to be invoked from contextual signals in lieu of necessitating a spoken invocation phrase to be invoked.

FIG. 5 illustrates a system 500 for providing intervening notifications via an application for mitigating computationally wasteful application launching behavior that is exhibited by some users. The application can be, but is not limited to, an automated assistant 504 that can operate as part of an assistant application that is provided at one or more computing devices, such as a computing device 502 and/or a server device. A user can interact with the automated assistant 504 via assistant interface(s) 520, which can be a microphone, a camera, a touch screen display, a user interface, and/or any other apparatus capable of providing an interface between a user and an application. For instance, a user can initialize the automated assistant 504 by providing a verbal, textual, and/or a graphical input to an assistant interface 520 to cause the automated assistant 504 to perform a function (e.g., provide data, control a peripheral device, access an agent, generate an input and/or an output, etc.).

Alternatively, the automated assistant 504 can be initialized based on processing of contextual data 536 using one or more trained machine learning models. The contextual data 536 can characterize one or more features of an environment in which the automated assistant 504 is accessible, and/or one or more features of a user that is predicted to be intending to interact with the automated assistant 504. The computing device 502 can include a display device, which can be a display panel that includes a touch interface for receiving touch inputs and/or gestures for allowing a user to control applications 534 of the computing device 502 via the touch interface. In some implementations, the computing device 502 can lack a display device, thereby providing an audible user interface output, without providing a graphical user interface output. Furthermore, the computing device 502 can provide a user interface, such as a microphone, for receiving spoken natural language inputs from a user. In some implementations, the computing device 502 can include a touch interface and can be void of a camera, but can optionally include one or more other sensors.

The computing device 502 and/or other third party client devices can be in communication with a server device over a network, such as the internet. Additionally, the computing device 502 and any other computing devices can be in communication with each other over a local area network (LAN), such as a Wi-Fi network. The computing device 502 can offload computational tasks to the server device in order to conserve computational resources at the computing device 502. For instance, the server device can host the automated assistant 504, and/or computing device 502 can transmit inputs received at one or more assistant interfaces 520 to the server device. However, in some implementations, the automated assistant 504 can be hosted at the computing device 502, and various processes that can be associated with automated assistant operations can be performed at the computing device 502.

In various implementations, all or less than all aspects of the automated assistant 504 can be implemented on the computing device 502. In some of those implementations, aspects of the automated assistant 504 are implemented via the computing device 502 and can interface with a server device, which can implement other aspects of the automated assistant 504. The server device can optionally serve a plurality of users and their associated assistant applications via multiple threads. In implementations where all or less than all aspects of the automated assistant 504 are implemented via computing device 502, the automated assistant 504 can be an application that is separate from an operating system of the computing device 502 (e.g., installed "on top" of the operating system)—or can alternatively be implemented directly by the operating system of the computing device 502 (e.g., considered an application of, but integral with, the operating system).

In some implementations, the automated assistant 504 can include an input processing engine 506, which can employ multiple different modules for processing inputs and/or outputs for the computing device 502 and/or a server device. For instance, the input processing engine 506 can include a speech processing engine 508, which can process audio data received at an assistant interface 520 to identify the text embodied in the audio data. The audio data can be transmitted from, for example, the computing device 502 to the server device in order to preserve computational resources at the computing device 502. Additionally, or alternatively, the audio data can be exclusively processed at the computing device 502.

The process for converting the audio data to text can include a speech recognition algorithm, which can employ neural networks, and/or statistical models for identifying groups of audio data corresponding to words or phrases. The text converted from the audio data can be parsed by a data parsing engine 510 and made available to the automated assistant 504 as textual data that can be used to generate and/or identify command phrase(s), intent(s), action(s), slot value(s), and/or any other content specified by the user. In some implementations, output data provided by the data parsing engine 510 can be provided to a parameter engine 512 to determine whether the user provided an input that corresponds to a particular intent, action, and/or routine capable of being performed by the automated assistant 504 and/or an application or agent that is capable of being accessed via the automated assistant 504. For example, assistant data 538 can be stored at the server device and/or the computing device 502, and can include data that defines one or more actions capable of being performed by the automated assistant 504, as well as parameters necessary to perform the actions. The parameter engine 512 can generate one or more parameters for an intent, action, and/or slot value, and provide the one or more parameters to an output generating engine 514. The output generating engine 514 can use the one or more parameters to communicate with an assistant interface 520 for providing an output to a user, and/or communicate with one or more applications 534 for providing an output to one or more applications 534.

In some implementations, the automated assistant 504 can be an application that can be installed "on-top of" an operating system of the computing device 502 and/or can itself form part of (or the entirety of) the operating system of the computing device 502. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 502. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (iot) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 502 can include one or more applications 534 which can be provided by a third party entity that is different from an entity that provided the computing device 502 and/or the automated assistant 504. An application state engine 516 of the automated assistant 504 and/or the computing device 502 can access application data 530 to determine one or more actions capable of being performed by one or more applications 534, as well as a state of each application of the one or more applications 534 and/or a state of a respective device that is associated with the computing device 502. A state processing engine 528 of the automated assistant 504 and/or the computing device 502 can access device data 528 to determine one or more actions capable of being performed by the computing device 502 and/or one or more devices that are associated with the computing device 502. Furthermore, the application data 530 and/or any other data (e.g., device data 528) can be accessed by the automated assistant 504 to generate contextual data 536, which can characterize a context in which a particular application 534 and/or device is executing, and/or a context in which a particular user is accessing the computing device 502, accessing an application 534, and/or any other device or module.

While one or more applications 534 are executing at the computing device 502, the device data 528 can characterize a current operating state of each application 534 executing at the computing device 502. Furthermore, the application data 530 can characterize one or more features of an executing application 534, such as content of one or more graphical user interfaces being rendered at the direction of one or more applications 534. Alternatively, or additionally, the application data 530 can characterize an action schema, which can be updated by a respective application and/or by the automated assistant 504, based on a current operating status of the respective application. Alternatively, or additionally, one or more action schemas for one or more applications 534 can remain static, but can be accessed by the application state engine 516 in order to determine a suitable action to initialize via the automated assistant 504.

In some implementations, the computing device 502 can include a context processing engine 518 that can process contextual data 536, device data 528, and application data 530. The context processing engine 518 can process this data to determine whether to check one or more states of one or more modules of one or more applications 534. For example, an application 534 can include a module for playing a game and another module for sending messages. The context processing engine 518 can access the target application 534 and access the message module based on previous interactions between a user and the application 534, in which the user accessed the message module. In this way, the context processing engine 518 can proactively access state data for one or more modules in a background process before the user launches a corresponding target application. In some implementations, the context processing engine can employ an access machine learning (ML) model 550, which can be used to determine when to access a particular target application for determining a state of one or more modules of the target application. In some implementations, a decision to access a state of a target application module can be determined using the access ML model 550, which can be used when processing contextual data 536, device data 528, and/or application data 530 in order to determine the time to access the target application. The access ML model 550 can be trained using data that is based on previous interactions between one or more users and one or more applications.

In some implementations, the computing device 502 can include an application state engine 526, which can emulate user interactions with one or more applications 534 in order to identify one or more states of one or more modules of an application 534. For example, an application of the applications 534, and/or the automated assistant 504, can employ the application state engine 526 in order to interact with a target application of the applications 534. The interaction between the application and the target application can involve the application providing one or more inputs to the target application and processing data provided by the target application. The one or more inputs can be selected based on previous interactions in which the user accessed the target application and provided one or more similar inputs to the target application in order to access one or more modules. In some implementations, the one or more inputs can be selected using a navigation ML model 552, which can be used when processing contextual data 536, device data 528, and/or application data 530 in order to select particular inputs for accessing a particular module of a target application. The navigation ML model 552 can be trained using data that is based on previous interactions between one or more users and one or more applications.

In some implementations, the one or more inputs provided by the application can be selected based on a heuristic process in which the application identifies inputs that the user has previously provided in order to reach a particular module of interest, and also identifies inputs that user had previously provided but reached another module that was of less interest to the user. In some implementations, the one or more inputs provided by the application can be selected based on one or more trained machine learning model. For example, the application can cause the target application to be launched in a background process, and one or more portions of content provided in response to launching a target application can be processed using the one or more trained machine learning models. Based on this processing, one or more inputs can be selected by the application and provided to the target application, in order to navigate to a particular module of interest to the user. Content data subsequently provided in response to the one or more inputs can be processed again using the one or more trained machine learning models. This subsequent content data can be processed to determine whether any additional inputs should be provided to the target application in order to reach a particular module, or whether a particular module that is of interest to the user is currently being accessed by the application.

When the application determines that a particular state and/or module of the target application is of interest to the user, the computing device 502 can employ a state processing engine 528. The state processing engine 528 can access state data characterizing the module that the application has navigated to during emulation of user inputs. The state data can be processed by the state processing engine 528 to determine whether a current state of a particular module satisfies notification criteria. For example, the state data can be based on information that is used by the target application to render output (e.g., a graphical user interface, audio, natural language content, etc.) for the target application and/or the module. When the state data characterizes a graphical user interface that was previously accessed by the user, and the user shows no particular interest in the graphical user interface, the state data can be determined to not satisfy the notification criteria. However, when the state data characterizes an updated graphical user interface that the user has not seen yet, and the user has previously expressed interest in such updated graphical user interfaces, the state processing engine 528 can determine that the state data satisfies the notification criteria.

In some implementations, the state processing engine 528 can process the state data and/or previous state data using a trained machine learning model, such as a state ML model 554. Alternatively, or additionally, difference data characterizing a difference between a current state of the module and a previous state of the module can be processed by the state processing engine 528. An output generated using the state ML model 554 can indicate that the current state of the module of a target application satisfies notification criteria or does not satisfy notification criteria. For example, the notification criteria can be a threshold value, and when a probability generated using the state ML model 554 satisfies the threshold value, the notification criteria can be considered to be satisfied. For instance, pixel data characterizing a state of a module of a game application can be different from previous pixel data characterizing a previous date of the module. Based on prior interactions between the user and the game application, when the difference between the pixel data and the previous pixel data is attributed to an advertisement, processing of the difference between pixel data can result in a probability that does not satisfy the notification criteria. However, when the difference between the pixel data in the previous pixel data is attributed to an opponent having a new status (e.g., an opponent in chess has moved their pawn), processing of the difference between pixel beta can result in another probability that does satisfy the notification criteria.

When the notification criteria is satisfied, a notification generation engine 540 can process state data corresponding to a module that was accessed by the application. In some implementations, the state data can characterize a state of a module that is determined to be of interest to the user based on previous interactions. The notification generation engine 540 can generate content for a notification that can be rendered at an interface of the computing device 502. In some implementations, the notification generation engine 540 can generate a notification that indicates that the application has identified a notification based on a target application. Alternatively, or additionally, the notification generation engine 540 can generate a notification that includes content characterizing the current state of the module of the target application. Alternatively, or additionally, the notification generation engine 540 can generate a notification that includes other continent characterizing a difference between the current state of the module and a previous state of the module, when the user previously accessed the target application and viewed an interface of the module. In some implementations, further training data can be generated based on whether the user interacts with the notification rendered by the application or not. One or more machine learning modules can be trained using this further training data in order to provide subsequent notifications that are more relevant to a user and mitigate a frequency at which these are launches an application to check one or more modules.

Figure 6:
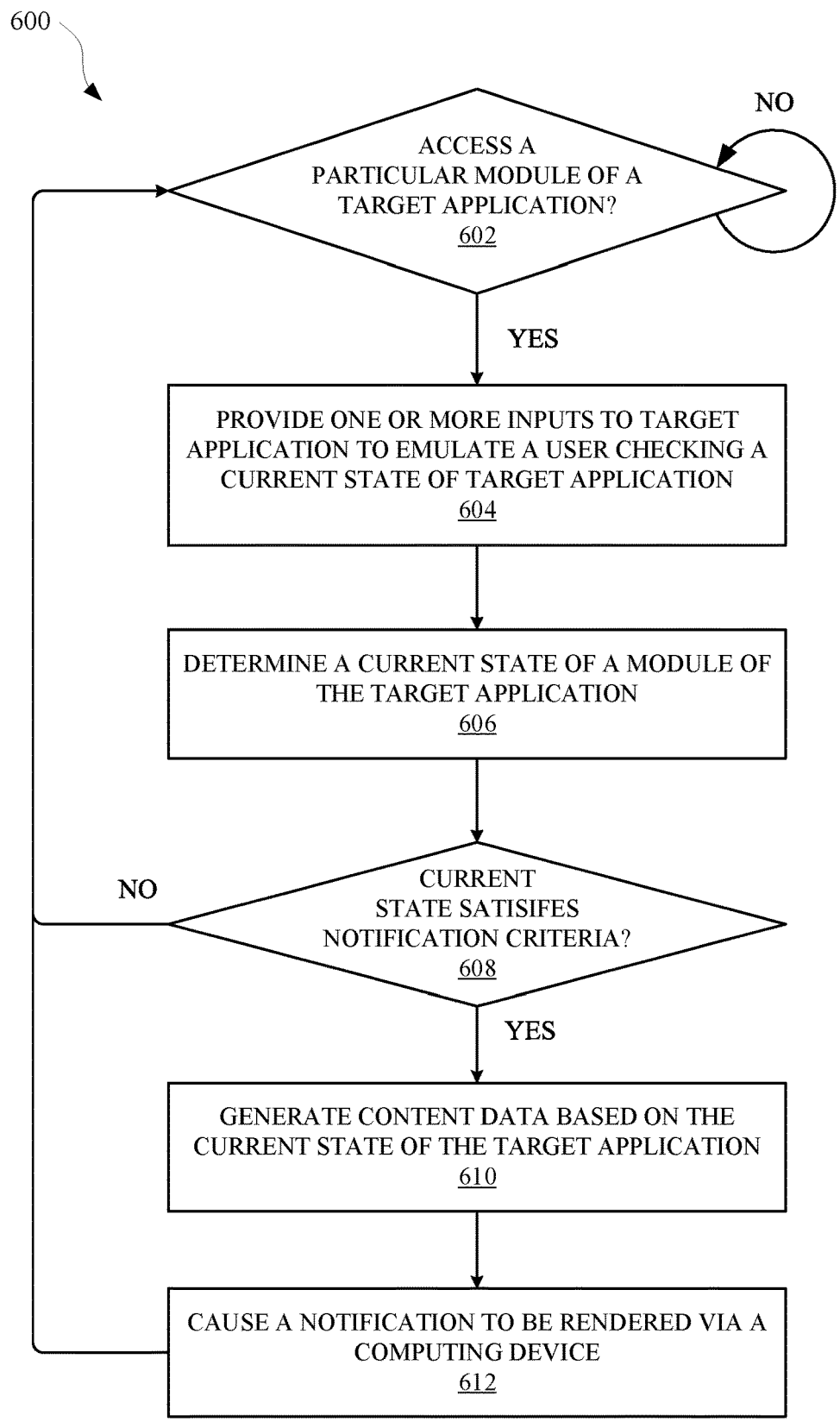
FIG. 6 illustrates a method for providing intervening notifications to a user based on application launching behavior previously exhibited by the user or another user, in order to mitigate such application launching behavior.

FIG. 6 illustrates a method 600 for providing intervening notifications to a user based on application launching behavior previously exhibited by the user or another user, in order to mitigate such application launching behavior. The method 600 can be performed by one or more applications, devices, and/or any other apparatus or module capable of providing notifications. The method 600 can include an operation 602 of determining whether to access a particular module of a target application. In some implementations, this determination can be based on previous interactions between a user and the target application. For example, an application can determine that the user frequently launches the target application in order to access the particular module. The application can also determine when the user would prefer to be notified about changes to a state of the particular module. For example, the application can determine that the user typically checks the target application upon arriving home from a geolocation corresponding to their workplace. Therefore, the application can preemptively access the particular module of the target application when the user is on their way home from their workplace or has arrived home. When the application determines to access the particular module of the target application, the method 600 can proceed from the operation 602 to an operation 604. Otherwise, the application can continue to determine when to access one or more modules of one or more target applications.

The operation 604 can include providing one or more inputs to the target application in order to emulate the user checking a current state of the particular module of the target application. In some implementations, the one or more inputs can be identified based on a heuristic method in which the application, with prior permission from the user, identifies one or more inputs that the user provides to the target application to reach the particular module. In other implementations, the one or more inputs can be identified based on processing data using one or more machine learning models. The one or more machine learning models can be trained using data that is based on previous interactions between the user and the target application. For example, when the user participates in a particular interaction with the target application, the application can generate data characterizing inputs provided to the target application during the particular interaction. In some implementations, the particular interaction includes the user accessing a particular module of the target application for at least a threshold amount of time. Alternatively, or additionally, the particular interaction can include a threshold number of inputs, one or more types of inputs, a particular portion of content, and/or any other feature that can distinguish an interaction between the user and the target application.

The method 600 can include an operation 606 of determining a current state of a module of the target application. In some implementations, the module can correspond to one or more particular interfaces of the target application. Alternatively, or additionally, the module can correspond to one or more particular functions of the target application and/or one or more particular actions of the target application. In this way, a notification generated by the application (e.g., an application, an operating system, and/or any other software) can indicate a state, progress, and/or usage of a particular interface, action, and/or function of the target application.

The method 600 can proceed from the operation 606 to an operation 608 of determining whether the current state of the module satisfies a notification criteria. In some implementations, the notification criteria can refer to an output resulting from processing the module data using a trained machine learning module. When the output corresponds to an indication that the notification criteria is satisfied (e.g., the output is "1"), the method 600 can proceed from the operation 608 to an operation 610. When the output corresponds to a different indication that the notification criteria is not satisfied (e.g., the output is "0"), the method 600 can proceed from the operation 608 to the operation 602. In some implementations, the notification criteria can be satisfied when the current state of the module is different from a previous state of the module. Alternatively, or additionally, the notification criteria can be satisfied when content of an interface for the module includes particular content (e.g., word(s), image(s), audio, etc.) that is different from other content capable of being provided by one or more target applications.

The operation 610 can include generating content data based on the current state of the target application. In some implementations, content data can characterize the current state of the module, identify the target application, identify a difference between the current state of the module and a previous state of the module, and/or include natural language content, text, audio, video, image(s), and/or any other content that can be included in a notification at a computing device.

The method 600 can proceed from the operation 610 to an operation 612 that includes causing a notification to be rendered via a computing device or another computing device. In some implementations, the notification can be rendered as an intervening notification before a user has a chance to observe the current state of the module. Furthermore, the notification can be rendered by the application when a user is determined to be viewing, or otherwise interacting with the computing device or another computing device. In some implementations, data can be generated based on an interaction between the user and the notification in order to further train a machine learning model for use when providing a subsequent intervening notification.

Figure 7:
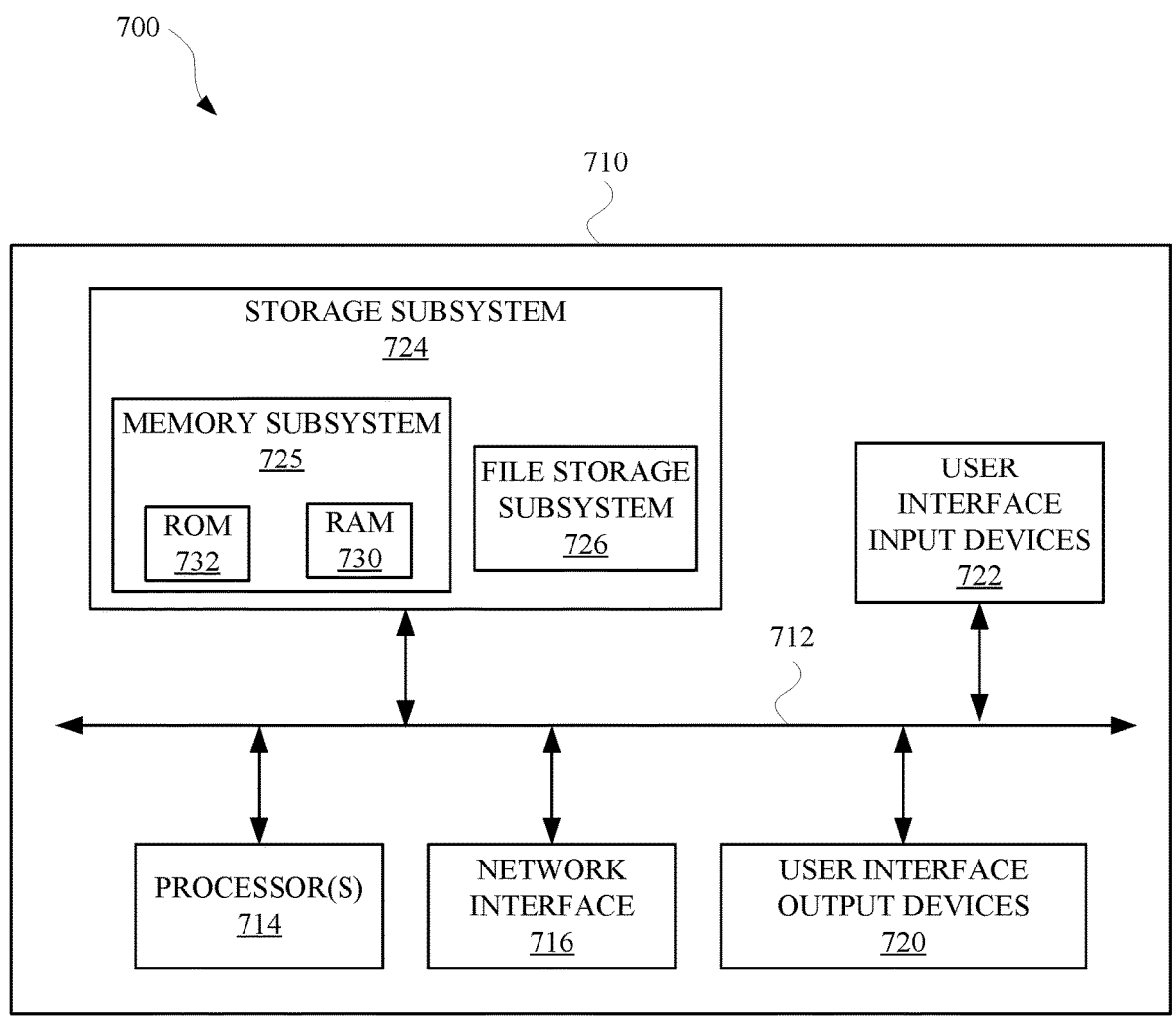
FIG. 7 is a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more of system 500, computing device 104, computing device 204, application, target application, remote computing device 310, computing device 404, other computing device 410, and/or any other application, device, apparatus, and/or module discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an application, a current state of a module of a target application based on target application data, wherein a user can access the target application via a computing device to determine whether any change to a state of the module of the target application has occurred. The method can further include an operation of generating, based on determining the current state of the module, state data that characterizes a difference between the current state of the module and a previous state of the module, wherein generating the state data is performed without visibly rendering, at the computing device, any graphical user interface corresponding to the target application. The method can further include an operation of processing the state data to determine whether the difference between the current state of the module and the previous state of the module satisfies a notification criteria, wherein, whether the difference between the current state of the module and the previous state of the module satisfies the notification criteria is determined based on previous interactions in which one or more users accessed the target application. The method can further include an operation of, when the notification criteria is determined to be satisfied: generating content data that is associated with the target application, and causing a notification to be rendered via the computing device or another computing device, wherein the notification identifies at least a portion of the content data.

In some implementations, the previous interactions include a prior instance in which the user accessed the target application multiple times within a threshold period of time. In some implementations, the notification criteria is satisfied when processing of the state data results in an indication that the module is predicted to receive one or more particular inputs from one or more users in response to the one or more users viewing the current state of the module. In some implementations, the positive interaction includes the user viewing the target application for a threshold period of time or the user providing one or more particular inputs to the target application. In some implementations, causing the notification to be rendered via the computing device or another computing device includes causing the application to render the notification while the target application is not executing at the computing device.

In some implementations, determining the current state of the module based on target application data includes: providing one or more inputs to the target application, or an entity associated with the target application, in order to access the module, wherein the one or more inputs are selected for providing to the target application, or the entity, based on the previous interactions in which the one or more users accessed the target application to determine whether any change to the state of the module has occurred. In some implementations, determining the current state of the module based on target application data includes: providing one or more inputs to the target application, or an entity associated with the target application, in order to access the module, wherein the one or more inputs are selected using the trained machine learning model or another trained machine learning model. In some implementations, wherein the one or more inputs to the target application emulate previous user interactions between one or more users and the target application, and wherein the trained machine learning model or the other trained machine learning model is trained using instances of training data that are based on the previous user interactions between the one or more users and the target application.

In some implementations, the method can further include an operation of determining, by the application, another current state of a separate target application based on separate target application data; and processing separate state data to determine whether the other current state satisfies a separate notification criteria that is different from the notification criteria. In some implementations, the method can further include an operation of, when the separate notification criteria is determined to be satisfied: accessing separate content data that is based on the other current state of the separate target application, wherein causing the notification to be rendered, via the computing device or another computing device, includes causing the notification to include at least a portion of the separate content data.

In some implementations, the notification criteria is generated using a trained machine learning model that is trained using training data. In some implementations, the content data that is further based on the current state of the module of the target application. In some implementations, the method can further include an operation of processing contextual data that characterizes features of an environment that includes the user, wherein the contextual data is generated by one or more computing devices associated with the user, and wherein determining the current state of the module of the target application is performed based on processing the contextual data. In some implementations, processing the contextual data is performed using a trained machine learning model that is trained using instances of training data that are based on previous interactions between one or more users and the target application.

In some implementations, the method can further include an operation of providing, prior to causing the notification to be rendered via the computing device or the other computing device, a separate notification to be rendered at the computing device or the other computing device, wherein the separate notification includes natural language content indicating that the application is capable of generating the notification in lieu of the user manually accessing the module of the target application. In some implementations, determining the current state of the target application based on target application data includes: accessing first module data characterizing a first graphical user interface for the current state of the module of the target application and second module data characterizing a second graphical user interface of the previous state of the module of the target application, and determining a variation of the first graphical user interface from the second graphical user interface, wherein the variation is characterized by the target application data.

In other implementations, a method implemented by one or more processors is set forth as including operations such as determining, by an application, that a user has caused a target application to launch at a computing device, wherein the application is different from the target application. The method can further include an operation of identifying a module that the user has accessed after the user launched the target application, wherein identifying the module includes providing one or more inputs from the application to the target application. The method can further include an operation of determining, based on the module of the target application, that the user is participating in a particular interaction with the module. The method can further include an operation of generating, based on the interaction, training data that characterizes the interaction between the user and the module of the target application. The method can further include an operation of causing, using the training data, a machine learning model to be trained based on the interaction between the user and the module of the target application.

In some implementations, the method can further include an operation of, subsequent to causing the machine learning model to be trained using the training data: causing the computing device to process contextual data using the machine learning model, and causing an automated assistant to provide an output to the user based on processing the contextual data using the machine learning model, wherein the contextual data identifies the target application and the output is a notification that includes content from the target application. In some implementations, determining that the user is participating in the particular interaction with the module includes: determining that a feature of the particular interaction is the same as another feature of a prior interaction between the user and the module. In some implementations, the feature is a first interaction time satisfying a threshold amount of interaction time, and the other feature is a second interaction time that also satisfies the threshold amount of interaction time.

In yet other implementations, a method implemented by one or more processors is set forth as including operations such as receiving, at a target application, one or more inputs from an application, or an entity associated with the application, for accessing a module of the target application. The method can further include an operation of providing, to the application and based on the one or more inputs, state data that characterizes a current state of the module, wherein providing the state data is performed without visibly rendering any graphical user interface corresponding to the target application. The method can further include an operation of causing the application to determine whether the current state of the module satisfies a notification criteria, wherein the application determines the notification criteria based on previous interactions in which one or more users accessed the target application. The method can further include an operation of when the notification criteria is determined, by the application, to be satisfied: causing the application to generate content data that is associated with the target application, and causing, based on the notification criteria being satisfied, a notification to be rendered via the application or the target application, wherein the notification identifies at least a portion of the content data.

In some implementations, the one or more inputs emulate a user accessing the module of the target application. In some implementations, the one or more inputs are selected, by the application, using a trained machine learning model that is trained using training data that is based on the previous interactions between the one or more users and the target application. In some implementations, the previous interactions include a prior instance in which the one or more users accessed the target application multiple times within a threshold period of time. In some implementations, the training data is further based on another previous interaction between the one or more users and a previous notification provided by the application. In some implementations, the method can further include an operation of, when the notification criteria is determined, by the application, to be satisfied: causing the application to determine whether or not one or more users interacted with the notification, and causing the application generate an instance of other training data based on whether or not the one or more users interacted with the notification. In some implementations, the instance of other training data is used to train another machine learning model for generating further notification criteria.

We claim:

1. A method implemented by one or more processors, the method comprising:
   determining, by an application, a current state of a module of a target application based on target application data,
      wherein a user can access the target application via a computing device to determine whether any change to a state of the module of the target application has occurred;
   generating, based on determining the current state of the module, state data that characterizes a difference between the current state of the module and a previous state of the module,
      wherein generating the state data is performed without visibly rendering, at the computing device, any graphical user interface corresponding to the target application;
   processing the state data to determine whether the difference between the current state of the module and the previous state of the module satisfies a notification criteria,
      wherein, whether the difference between the current state of the module and the previous state of the module satisfies the notification criteria is determined based on previous interactions in which one or more users accessed the target application; and
   when the notification criteria is determined to be satisfied:
      generating content data that is associated with the target application, and
      causing a notification to be rendered via the computing device or another computing device,
         wherein the notification identifies at least a portion of the content data.

2. The method of claim 1, wherein the notification criteria is satisfied when processing of the state data results in an indication that the module is predicted to receive one or more particular inputs from one or more users in response to the one or more users viewing the current state of the module.

3. The method of claim 1, wherein causing the notification to be rendered via the computing device or another computing device includes causing the application to render the notification while the target application is not executing at the computing device.

4. The method of claim 1, wherein determining the current state of the module based on target application data includes:
   providing one or more inputs to the target application, or an entity associated with the target application, in order to access the module,
      wherein the one or more inputs are selected for providing to the target application, or the entity, based on the previous interactions in which the one or more users accessed the target application to determine whether any change to the state of the module has occurred.

5. The method of claim 1, wherein determining the current state of the module based on target application data includes:
   providing one or more inputs to the target application, or an entity associated with the target application, in order to access the module,
      wherein the one or more inputs are selected using a trained machine learning model.

6. The method of claim 5,
   wherein the one or more inputs to the target application emulate previous user interactions between one or more users and the target application, and
   wherein the trained machine learning model is trained using instances of training data that are based on the previous user interactions between the one or more users and the target application.

7. The method of claim 1, further comprising:
   determining, by the application, another current state of a separate target application based on separate target application data; and
   processing separate state data to determine whether the other current state satisfies a separate notification criteria that is different from the notification criteria.

8. The method of claim 7, further comprising:
   when the separate notification criteria is determined to be satisfied:
      accessing separate content data that is based on the other current state of the separate target application,
         wherein causing the notification to be rendered, via the computing device or another computing device, includes causing the notification to include at least a portion of the separate content data.

9. The method of claim 1, further comprising:
   processing contextual data that characterizes features of an environment that includes the user,
      wherein the contextual data is generated by one or more computing devices associated with the user, and
      wherein determining the current state of the module of the target application is performed based on processing the contextual data.

10. The method of claim 9, wherein processing the contextual data is performed using a trained machine learning model that is trained using instances of training data that are based on previous interactions between one or more users and the target application.

11. The method of claim 9, further comprising:
    providing, prior to causing the notification to be rendered via the computing device or the other computing device, a separate notification to be rendered at the computing device or the other computing device,
      wherein the separate notification includes natural language content indicating that the application is capable of generating the notification in lieu of the user manually accessing the module of the target application.

12. The method of claim 1, wherein determining the current state of the target application based on target application data includes:
    accessing first module data characterizing a first graphical user interface for the current state of the module of the target application and second module data characterizing a second graphical user interface of the previous state of the module of the target application, and determining a variation of the first graphical user interface from the second graphical user interface, wherein the variation is characterized by the target application data.

13. A method implemented by one or more processors, the method comprising:
receiving, at a target application, one or more inputs from an application, or an entity associated with the application, for accessing a module of the target application;
providing, to the application and based on the one or more inputs, state data that characterizes a current state of the module;
wherein providing the state data is performed without visibly rendering any graphical user interface corresponding to the target application;
causing the application to determine whether the current state of the module satisfies a notification criteria,
wherein the application determines the notification criteria based on previous interactions in which one or more users accessed the target application; and
when the notification criteria is determined, by the application, to be satisfied:
causing the application to generate content data that is associated with the target application, and
causing, based on the notification criteria being satisfied, a notification to be rendered via the application or the target application,
wherein the notification identifies at least a portion of the content data.

14. The method of claim 13, wherein the one or more inputs emulate a user accessing the module of the target application.

15. The method of claim 13, wherein the one or more inputs are selected, by the application, using a trained machine learning model that is trained using training data that is based on the previous interactions between the one or more users and the target application.

16. The method of claim 15, wherein the previous interactions include a prior instance in which the one or more users accessed the target application multiple times within a threshold period of time.

17. The method of claim 15, wherein the training data is further based on another previous interaction between the one or more users and a previous notification provided by the application.

18. The method of claim 13, further comprising:
when the notification criteria is determined, by the application, to be satisfied:
causing the application to determine whether or not one or more users interacted with the notification, and
causing the application generate an instance of other training data based on whether or not the one or more users interacted with the notification.

19. The method of claim 18, wherein the instance of other training data is used to train another machine learning model for generating further notification criteria.

20. A system comprising:
one or more processors; and
memory storing instructions that, when executed by the one or more processors, cause the one or more processors to:
determine, by an application, a current state of a module of a target application based on target application data;
generate, based on determining the current state of the module, state data that characterizes a difference between the current state of the module and a previous state of the module,
wherein generating the state data is performed without visibly rendering, at the computing device, any graphical user interface corresponding to the target application;
process the state data to determine whether the difference between the current state of the module and the previous state of the module satisfies a notification criteria,
wherein, whether the difference between the current state of the module and the previous state of the module satisfies the notification criteria is determined based on previous interactions in which one or more users accessed the target application; and
when the notification criteria is determined to be satisfied:
generate content data that is associated with the target application, and
cause a notification to be rendered via the computing device or another computing device,
wherein the notification identifies at least a portion of the content data.

* * * * *